United States Patent [19]

Graber

[11] Patent Number: 4,513,897
[45] Date of Patent: Apr. 30, 1985

[54] VEHICLE ATTACHED CARRIER

[75] Inventor: John W. Graber, Stoughton, Wis.

[73] Assignee: Graber Products, Inc., Madison, Wis.

[21] Appl. No.: 574,337

[22] Filed: Jan. 27, 1984

[51] Int. Cl.³ .............................................. B60R 9/10
[52] U.S. Cl. ............................... 224/314; 224/42.03 B;
224/315; 211/5
[58] Field of Search ................ 224/42.03 R, 42.03 A,
224/42.03 B, 309, 314, 321, 329, 315;
248/188.2, 188.8, 188.9, 240.2, 148, 237; 211/4,
5

[56] References Cited

U.S. PATENT DOCUMENTS

| Re. 29,840 | 11/1978 | Wasserman | 224/42.03 B |
|---|---|---|---|
| 3,917,138 | 11/1975 | Bergeron | 211/5 |
| 3,927,811 | 12/1975 | Nussbaum | 224/314 |
| 3,970,196 | 7/1976 | Legge | 211/5 |
| 4,085,874 | 4/1978 | Graber | 224/42.03 B |
| 4,182,467 | 1/1980 | Graber | 224/309 |
| 4,290,540 | 9/1981 | Allen | 224/42.03 B |
| 4,394,948 | 7/1983 | Graber | 224/314 |
| 4,432,479 | 2/1984 | Graber | 224/322 |

Primary Examiner—Stephen Marcus
Assistant Examiner—David Voorhees
Attorney, Agent, or Firm—Vernon J. Pillote

[57] ABSTRACT

A carrier for mounting on the rear body portion of a vehicle including a frame having front and rear pairs of legs interconnected at their upper ends and with their distal ends spaced apart to engage the rear body portion of a vehicle at spaced locations. A rear vehicle engaging foot assembly is provided on each of the rear legs and includes a U-shaped bracket member pivotally mounted intermediate its ends to the distal end of the rear leg, and a pair of foot members pivotally mounted at the ends of the bracket member to enable the foot members to conform to different vehicle contours including convex and concave surfaces, independent of the angular position of the rear leg relative to the body surface. The carrier is provided with bicycle support arms and a lever is pivotally mounted on the outer end of one of the arms and arranged to be locked to the arm by a padlock to inhibit theft of the bicycles.

6 Claims, 5 Drawing Figures

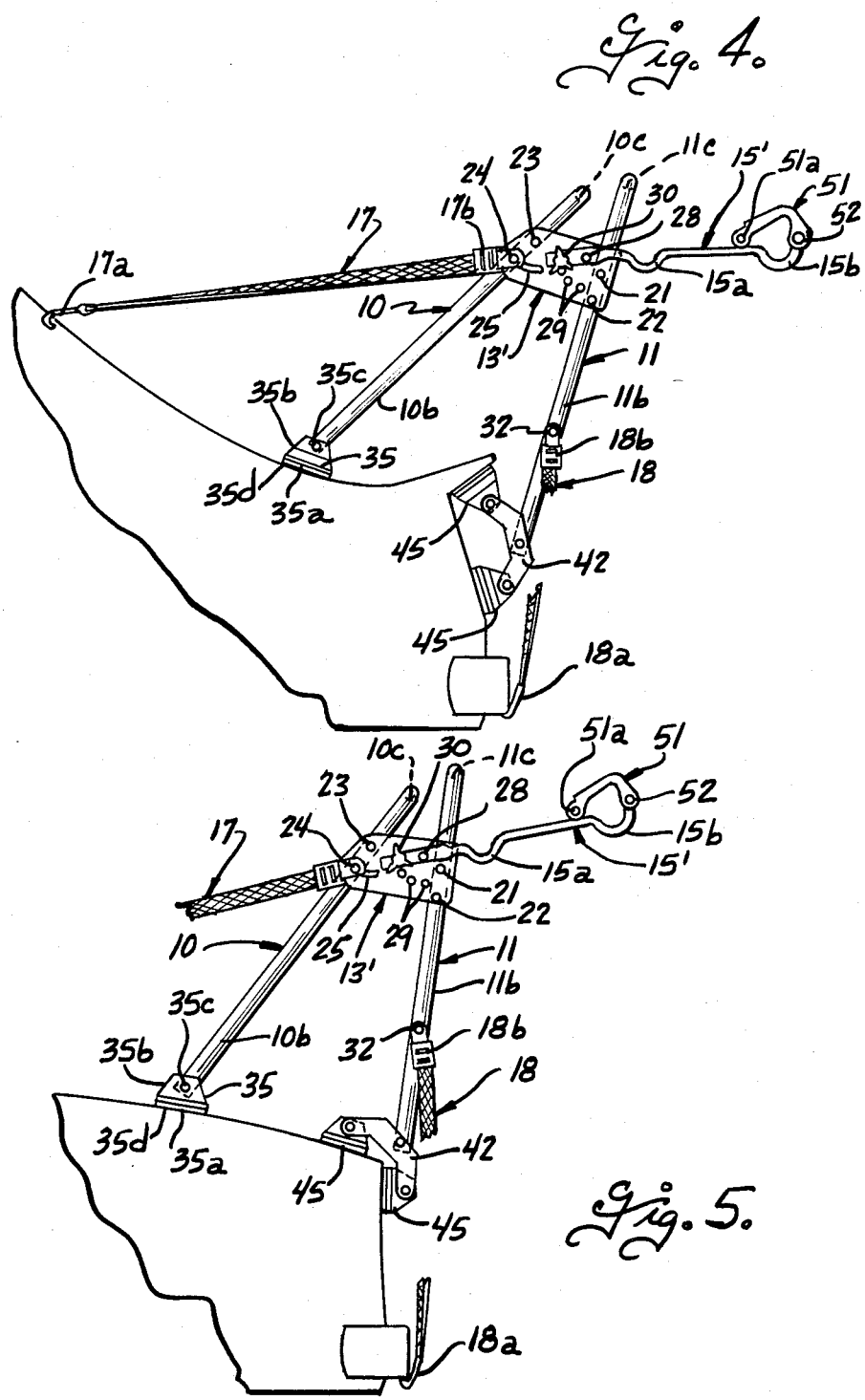

VEHICLE ATTACHED CARRIER

BACKGROUND OF THE INVENTION

Various different carriers, for example, as shown in U.S. Pat. Nos. 4,085,874; 4,182,467 and 4,394,948, have heretofore been made for mounting on the rear portion of different vehicles. In general, such carriers include a pair of rear legs and a pair of forward legs and vehicle engaging feet on the ends of the legs for supporting the carrier on the rear portion of the vehicle body.

The contour of the rear portion of different styles and makes of vehicles varies widely, particularly in the area engaged by the feet on the rear legs of the carrier. For example, the rear deck in some sedans turns down in an abrupt curve or bend at the rear of the vehicle, while in some sports cars having an air fin or simulated air fin, the body portion of the vehicle below the air fin frequently has an inward curve or bend. Some problems have been encountered in providing a stable mounting of the rear feet of the carrier on such rear body portions having abrupt changes in contour.

In vehicle attached bicycle carriers that are mounted on the rear body portion of the vehicle such as disclosed in the aforementioned U.S. patents, the bicycles are mounted on a pair of arms that extend rearwardly from the vehicle. While the bicycles are strapped onto the arms to prevent dislodging of the bicycles during transportation, problems have been encountered with theft of the bicycles when the vehicle is parked. U.S. Pat. No. Re. 29,840 discloses a bicycle carrier for mounting on the rear body portion of a vehicle in which the bicycle is supported on rearwardly extending arms, and which uses an elongated cable that can be threaded through the bicycle frame and locked to the bicycle carrier by a pair of padlocks.

SUMMARY OF THE INVENTION

An important object of this invention is to provide a vehicle attached carrier for mounting on the rear body portion of the vehicle and which has vehicle engaging feet for the rear legs of the carrier that can conform to surfaces on the rear body portion of the vehicle of widely different contour, including surfaces that are sharply convex or concave, independent of the angular relation of the rear leg of the carrier to the surface of the body portion of the vehicle.

Another object of this invention is to provide a vehicle attached bicycle carrier for mounting on the rear body portion of the vehicle to support one or more bicycles on rearwardly extending arms at the rear of the vehicle, and which has a simple and reliable arrangement for locking the bicycle to the arm of the vehicle to inhibit theft of the bicycle.

According to one aspect of the present invention, there is provided a bicycle carrier for mounting on the rear body portion of a vehicle including a carrier frame having front and rear pairs of elongated legs interconnected at their upper ends and with the distal ends spaced apart to engage a rear body portion of the vehicle at spaced locations, a front vehicle engaging foot on the distal end of each of the front pair of legs, and a rear vehicle engaging foot assembly on the distal end of each leg of the rear pair of legs. Each rear vehicle engaging foot assembly includes a pair of generally U-shaped bracket members disposed in generally parallel relation at opposite sides of the distal end of the respective one of the legs of the rear pair, and each of the bracket members have an intermediate web portion and first and second leg portions and first and second parallel pivot pins respectively extending between the first and second leg portions of each pair of bracket members adjacent the distal ends thereof. Each vehicle engaging foot assembly also includes first and second vehicle engaging foot members each having a generally flat vehicle engaging face and a mounting portion extending above the vehicle engaging face, the mounting portions of the vehicle engaging foot members having openings therethrough generally paralleling the associated vehicle engaging face for receiving the respective first and second pivot pins to support the foot members for pivotal movement relative to the bracket members about the axis of the first and second pivot pins. Each rear vehicle engaging foot assembly also includes a bracket pivot pin extending through the web portions of the pair of bracket members and through the associated rear leg adjacent its distal end for pivotally mounting the pair of bracket members for movement about a bracket pivot axis transverse to the associated rear leg and parallel to and medially between the associated first and second pivot pins. The bracket pin axes on the rear pair of legs are disposed in substantial axial alignment and the bracket pivot axis of each rear vehicle engaging foot assembly is offset from a plane through the associated first and second pivot pins a distance sufficient to allow the bracket members to pivot relative to the associated rear leg into positions in which the first and second rear vehicle engaging foot members are disposed at relatively opposite sides of the associated rear leg outwardly of the distal end thereof and also into positions in which both the first and second rear vehicle engaging foot members are disposed at the same side of the associated rear leg adjacent the distal end thereof. The first and second vehicle engaging foot members are movable about the respective first and second pivot axes relative to the associated pair of bracket members into positions in which the vehicle engaging faces on the first and second foot members converge to conform to convex exterior surfaces on a vehicle and into positions in which the vehicle engaging faces diverge to conform to concave exterior surfaces on the vehicle. Strap means are provided for holding the carrier on the vehicle.

In accordance with another aspect of the present invention, there is provided a bicycle carrier for mounting on the rear body portion of the vehicle including a carrier frame having front and rear pairs of elongated legs interconnected at their upper ends and with their distal ends spaced apart to engage the rear body portion of the vehicle at spaced locations, a pair of bicycle support arms mounted on the frame and extending outwardly therefrom, front and rear vehicle engaging feet on the distal ends of each of the legs, a lever pivotally mounted at one end on the outer end of one of the bicycle support arms for swinging movement in an upright plane between the first position extending outwardly from said one bicycle support arm to a second position extending inwardly from the distal end of said one bicycle support arm in overlying relation thereto, the lever having an opening therethrough spaced from its pivoted end for receiving the shackle of a padlock, and a padlock is provided for locking the lever to said one arm in the second position of the lever. Locking of a bicycle at the outer end of the arm to the arm will automatically prevent theft of a second bicycle supported on the arms inwardly of the outer ends thereof.

BRIEF DESCRIPTION OF THE DRAWINGS

FIG. 4 is a fragmentary side elevational view of a vehicle of a type having a concave rear body portion, and showing the bicycle carrier of the present invention mounted thereon;

FIG. 5 is a fragmentary side elevational view of the rear body portion of a vehicle having a convex rear body portion, and showing the vehicle attached carrier of the present invention mounted thereon.

Figure 1:
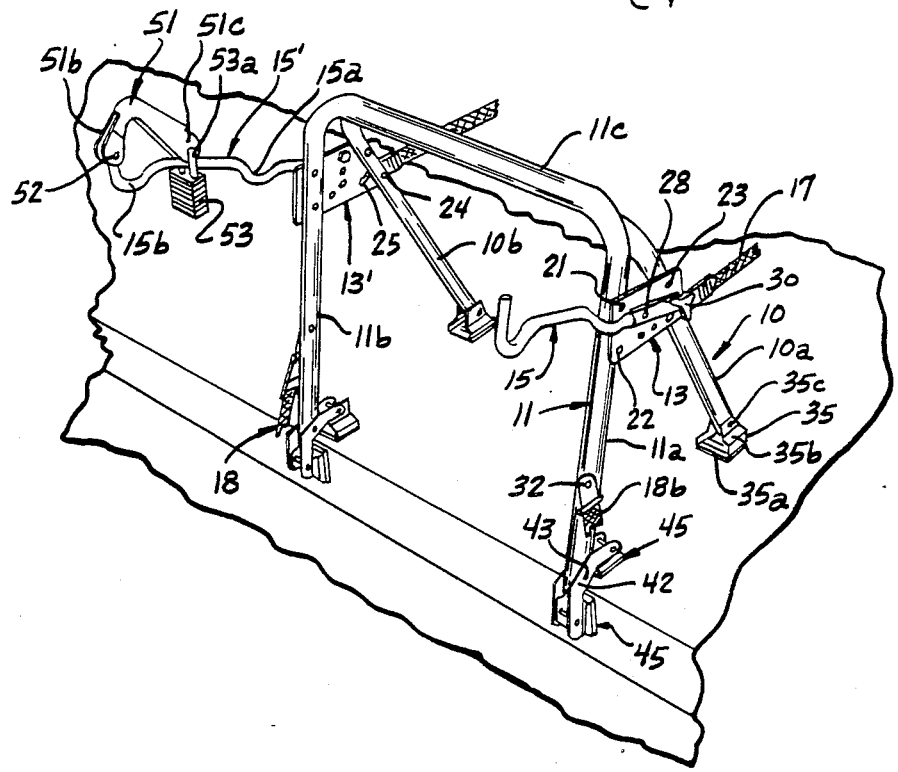
FIG. 1 is a perspective view of a vehicle attached carrier embodying the present invention and shown mounted on the rear body portion of a vehicle.

The present invention relates to vehicle attached carriers of the type adapted for mounting on the rear body portion of the vehicle and which includes a carrier frame having front and rear pairs of legs interconnected at their upper ends and with their distal ends spaced apart to engage the rear body portion of the vehicle at spaced locations. In the embodiment illustrated, the carrier frame is generally of the type disclosed in U.S. Pat. No. 4,394,948 issued to Joseph V. Graber on July 26, 1983, to which reference is made for a more complete description. In general, the carrier includes front and rear rigid transverse frames 10 and 11 of generally U-shaped configuration, and first and second side plates 13 and 13' connecting the transverse frames 10 and 11 for relative movement between a folded condition in which the transverse frames are disposed adjacent each other, and an erected condition in which the legs of the transverse frames diverge relative to each other. The carrier is advantageously adapted for mounting bicycles on the rear portion of the vehicle and includes a pair of bicycle support arms 15, 15' that are mounted on the side plates 13 and 13' respectively for angular adjustment relative to the side plates and relative to the transverse frames 10 and 11 to enable the bicycle support arms to extend generally horizontally when the carrier rests on the rear body portion of different types of vehicles. The carrier is attached to the rear of the vehicle by first and second pairs of straps 17 and 18. The bicycle carrier is adapted for mounting on the rear portions of various different types of vehicles and when mounted on sedans, the transverse frame 11 is disposed rearwardly on the vehicle relative to the transverse frame 10. For convenience, the legs on the transverse frame 11 are herein and in the claims sometimes referred to as the rear legs and the legs on the frame 11 are herein and in the claims sometimes referred to as the front legs.

The U-shaped transverse frame 10 includes a pair of spaced leg portions 10a and 10b that are interconnected by a transverse intermediate portion 10c and the rear transverse frame includes spaced leg portions 11a, 11b and a transverse intermediate portion 11c. The transverse frames are formed of a light weight tubular metal such as steel tubing which is bent to form the aforementioned leg portions and transverse intermediate portion.

The side plates 13 and 13' are attached to the respective legs 11a, 11b of the rear frame 11 by fasteners 21, 22 which may be rivets, bolts or the like. The side plates 13, 13' are attached to legs of the front frame 10 by fasteners 23, 24 which also may be rivets or bolts. In order to permit folding of the front frame to a position alongside the rear frame, the side plates are formed with an arcuate slot 25 concentric with the fastener 23, and which receives the fastener 24. With this arrangement, the front frame can be moved to an opened position in which the fastener 24 is adjacent the rear end of the slot 25, for mounting the carrier on the vehicle body. When the carrier is removed, the front frame then can be moved to a position in general parallelism with the rear frame 11, for compact storage.

The arms 15, 15' are mounted on the side plates for angular adjustment relative to the side plates and relative to the front and rear frames to enable positioning of the arms to extend generally horizontally when the carrier is mounted on different vehicles. For this purpose, the arms 15 are pivotally mounted by a fastener such as a rivet or bolt 28 on the respective side plate and each side plate is provided with a plurality of openings 29 disposed in an arc concentric with the fastener 28 for receiving a removable fastener such as a bolt having a thumb nut 30. The straps 17 have a hook 17a at one end for engaging an edge of a panel such as a trunk lid or door on the rear portion of a vehicle, and the straps are secured at their other ends to the carrier by buckles 17b, conveniently attached by the fastener 24 to the front frame 10. With this arrangement, tension on the strap will be applied directly to the front frame at a location offset from the pivot 23 to aid in holding the front frame in an open position as shown in the drawings. The strap 18 has a hook 18a at one end for engaging an edge of a panel, door or bumper as shown, and a buckle 18b at its other end attached as by a fastener 32 to the rear frame.

Front vehicle engaging feet 35 are provided on the distal ends of the legs of the front frame 10 and are preferably pivotally attached to the leg portions to conform to the contour of the vehicle body at the point of engagement therewith. In general, the front vehicle engaging feet include a generally flat base 35a and upstanding ears 35b and a fastener such as a rivet or bolt 35c that extends through openings in the ears and through openings in the lower ends of the front legs to support the feet on the legs for pivotal movement about an axis transverse to the legs. A resilient pad 35d of rubber or the like underlies the base portion 12a of each vehicle engaging foot, to protect the vehicle finish.

Figure 2:
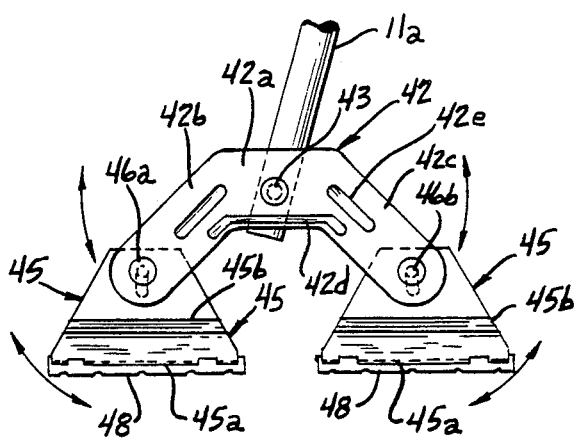
FIG. 2 is a fragmentary side elevational view of one of the rear vehicle engaging foot assemblies, shown on a larger scale than FIG. 1.
Figure 3:
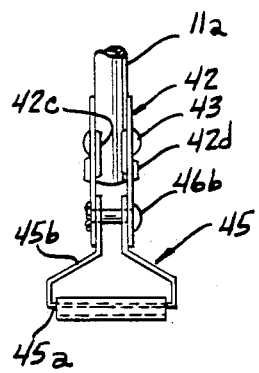
FIG. 3 is an end elevational view of the foot assembly shown in FIG. 2.

An improved vehicle engaging foot assembly is provided on the distal end of each of the legs of the rear frame, to support and anchor the rear legs on both convex and concave surfaces at the rear portion of the vehicle. Each rear vehicle engaging foot assembly includes a pair of generally U-shaped bracket members 42 disposed in generally parallel relation at opposite sides of the distal end of a respective one of the rear legs, and each pair of bracket members has an intermediate web portion 42a and first and second leg portions 42b and 42c that diverge outwardly relative to the intermediate leg portion. As shown in FIGS. 2 and 3 stiffening channels 42d and 42e are formed in web and leg portions of the bracket members. A pivot 43 such as a rivet or bolt extends through the web portions of the pair of bracket members 42 and through the associated rear leg 11a, 11b adjacent its distal end for pivotally mounting the pair of bracket members for movement about a bracket pivot axis transverse to the associated rear leg. The axis of the pivot extends crosswise of the vehicle and the bracket pivot axes on the rear legs are disposed in substantial axial alignment. A pair of foot members 45, conveniently of like construction, are provided on each bracket assembly and each foot member includes a generally flat rigid base 45a and ears 45b that extend outwardly from the base. First and second pivot pins 46a and 46b extend through openings in the ends of the leg portions 46a and through openings in the ears 45b on the foot members to support the members for pivotal movement relative to the legs of the bracket members about the axes of the respective pivot pin. Pins 46a and 46b extend parallel to the pivot 43 and are disposed in a plane that is offset from the pivot 43 a distance sufficient to allow the bracket members to pivot relative to the associated rear leg into positions in which the foot members are disposed at relatively opposite sides of the distal end of the leg as shown in FIG. 2, and also into positions in which both foot members are disposed at the same side of the leg adjacent its distal end, for example as shown in FIGS. 4 and 5. In order to enable the foot assemblies to accommodate a very wide range of different surfaces, the pivot pins 46a and 46b are offset from the pivot 43 a distance substantially greater than one-half the thickness of the leg 10a so that the brackets 42 can be swung to a position in which a plane through the pivots 46a and 46b extends generally parallel to the leg 46a, at least at the front side of the leg, as well as to a position as shown in FIG. 2 in which the plane through the pivots 46a and 46b extends crosswise of the distal end of the leg. The leg portions 42a and 42b of the bracket members diverge with an included angle of at least 90° and the pivot pins 46a and 46b are spaced apart a distance in relation to the length of the base 45a of the foot members 45 such that the foot members can be moved relative to the bracket members to a position in which the bases 45a are disposed inwardly of the pivot pins 46a and 46b and define an included angle therebetween of somewhat less than 90° and preferably of about 70° to 80° to conform to relatively sharply converging outside corners on the vehicle. The foot members can also be swung relative to the associated bracket members to a position in which the bases are disposed entirely outwardly of the pivot axes 46a and 46b and into positions in which the bases extend generally perpendicular to a plane through the pivot pins 46a and 46b. Resilient pads 48 of rubber or the like are provided on the bases 45a, to inhibit scratching of the surface of the vehicle. With the above described arrangement, the bracket members 42 can be pivoted relative to the rear legs and the foot members 45 can be pivoted relative to the bracket members to allow the foot members to conform to a sharply convex outside corner such as shown in FIG. 5, a sharply concave inside corner such as shown in FIG. 4, and to various other surfaces including flat surfaces, independent of the angular relationship of the rear legs of the carrier to the surface of the vehicle. Since the vehicle engaging feet can conform to both outside corners and inside corners, it will be seen that the vehicle engaging foot assemblies effectively hold the distal end of the rear legs against shifting relative to the vehicle body.

The bicycle carrier also includes an improved arrangement for inhibiting theft of bicycles from the carrier when the vehicle is parked. The vehicle support arms 15 are preferably formed with inner and outer depressions or saddles 15a and 15b at locations to engage the frames of a first and a second bicycle. A lever 51 is pivotally mounted by a pivot such as a rivet 52 to the outer end of one of the arms 15' for movement in an upright plane between an open position in which the lever extends outwardly from the distal end of the arm and a closed position in which the lever extends inwardly from the distal end of the arm in overlying relation thereto as shown in the drawings. The lever 51 has a shackle receiving opening 51a at its free end adapted to receive the shackle 53a of a padfree lock 53. With this arrangement, the shackle of the padlock can be inserted through the opening 51a in the lever 51 to lock the free end of the lever to the arm 15'. The lever is preferably angulated intermediate its ends as shown in the drawings to provide a generally L-shaped configuration, to increase the clearance for the bicycle frame above the outer saddle 15b of the arm. The lever 51 is conveniently formed of sheet metal which is bent into a transverse U-shaped cross-section and which has spaced ears 51b at one end that are adapted to receive the distal end of the arm 51b. The lever is also provided with spaced ears 51c at the other end having the shackle receiving opening 51a therein, which ears 51c can be spaced apart a distance sufficient to receive the arm therebetween, to allow the lever to be swung down to a position in which the openings 51a are disposed below the arm. As will be apparent, the lever can be locked to the arm with the shackle openings 51a either above the arm as shown or with the shackle openings below the arm.

From the foregoing it is thought that the construction and use of the vehicle attached carrier will be readily understood. The rear vehicle engaging foot assemblies 41 are pivotal relative to the associated rear leg of the carrier and the vehicle engaging foot members are pivotal relative to the bracket members 42 in such a manner as to allow the faces of the foot members to be disposed in relative converging relation as well as in relatively diverging relation to conform to the contour of widely different surfaces including convex and concave surfaces at the rear portion of the vehicle, independent of the angular relation of the rear legs relative to the body of the vehicle at the point of engagement therewith. This provides a stable support for the rear legs of the vehicle on vehicle bodies of widely different contour.

The lever pivotally attached to the outer end of the bicycle support arm provides a simple and reliable arrangement for locking the outer bicycle to the support arm and carrier. When the outer bicycle is locked to the support arm, a bicycle supported on the arms inwardly of the outer end is also locked against removal.

The embodiments of the invention in which an exclusive property or privilege is claimed are defined as follows:

1. A carrier for mounting on the rear body portion of a vehicle, the carrier including carrier frame means having front and rear pairs of elongated legs interconnected at their upper ends and with their distal ends spaced apart to engage a rear body portion of a vehicle at spaced locations, a front vehicle engaging foot for the distal end of each of the front pair of legs, a rear vehicle engaging foot assembly on the distal end of each leg of the rear pair of legs, each rear vehicle engaging foot assembly including a pair of generally U-shaped bracket members disposed in generally parallel relation at opposite sides of the distal end of a respective one of the legs of the rear pair, each pair of bracket members having an intermediate web portion and first and second leg portions, first and second parallel pivot pins respectively extending between the first and second leg portions of each pair of bracket members adjacent the distal ends thereof, each vehicle engaging foot assembly including first and second vehicle engaging foot members each having a generally flat vehicle engaging face and a mounting portion extending above the vehicle engaging face, the mounting portions of the vehicle engaging foot members having openings therethrough generally paralleling the associated vehicle engaging face for receiving the respective first and second pivot pins to support the foot members for pivotal movement relative to the bracket members about the axis of the respective pivot pin, each rear vehicle engaging foot assembly including a bracket pivot pin extending through the web portions of the pair of bracket members and through the associated rear leg adjacent its distal end for pivotally mounting the pair of bracket members for movement about a bracket pivot axis transverse to the associated rear leg and parallel to and medially between the associated first and second pivot pins, the bracket pivot axes on the rear pair of legs being disposed in substantial axial alignment, the bracket pivot axis of each rear vehicle engaging foot assembly being offset from a plane through the associated first and second pivot pins a distance sufficient to allow the bracket members to pivot relative to the associated rear leg into positions in which the first and second rear vehicle engaging foot members are disposed at relatively opposite sides of the associated rear leg outwardly of the distal end thereof and into positions in which both the first and second rear vehicle engaging foot members are disposed at one side of the associated rear leg adjacent the distal end thereof, the first and second vehicle engaging foot members being movable about the first and second pivot axes relative to the associated pair of bracket members into positions in which the vehicle engaging faces on the first and second foot members converge to conform to convex exterior surfaces gn a vehicle and positions in which the vehicle engaging faces diverge to conform to concave exterior surfces on the vehicle, and strap means for holding the carrier on a vehicle.

2. A carrier according to claim 1 wherein the leg portions of the bracket members diverge at an angle such that the first and second vehicle engaging foot members can be moved to a position in which they converge at an included angle of less than 90°.

3. A carrier according to claim 1 including a pair of bicycle support arms mounted on the frame means and extending outwardly therefrom, a lever pivotally mounted at one end on the outer end of one of the bicycle support arms for swinging movement in an upright plane between a first position extending outwardly of said one bicycle support arm and a second position extending inwardly from the distal end of said one bicycle support arm in overlying relation thereto, the lever.having an opening therethrough spaced from its pivoted end for receiving the shackle of a padlock, and a padlock for locking the lever in said second position.

4. A carrier according to claim 3 wherein the lever is angulated intermediate its ends to space an intermediate portion of the lever from said one arm when the lever is in said second position.

5. A bicycle carrier for mounting on the rear body portion of a vehicle, the carrier including carrier frame means and means for mounting the carrier frame means at the rear portion of a vehicle, a pair of bicycle support arms mounted on the carrier frame means and extending outwardly therefrom, the arms each having at least one bicycle frame receiving saddle inwardly of its distal end, a bicycle locking lever, horizontally disposed rivet means pivotally mounting one end of the bicycle locking lever on the distal end of one of the bicycle support arms for swinging movement in an upright plane between a first position extending outwardly from the distal end of said one bicycle support arm to a second position extending inwardly from the distal end of said one bicycle support arm in overlying relation to the bicycle receiving saddle in that arm, the lver having a shackle receiving opening therethrough spaced from its pivoted end a distance to extend crosswise of said one arm at a location inwardly of its bicycle frame receiving saddle when the lever is in its second position for receiving the shackle of a padlock, and a padlock for locking the lever to said one arm in said second position.

6. A bicycle carrier according to claim 5 wherein the lever is angulated intermediate its ends to space an intermediate portion of the lever from said one arm when the lever is in said second position.

* * * * *